United States Patent [19]

Wang et al.

[11] Patent Number: 5,753,202
[45] Date of Patent: May 19, 1998

[54] METHOD OF PREPARATION OF LITHIUM MANGANESE OXIDE SPINEL

[75] Inventors: Enoch I. Wang, Mansfield, Mass.; William L. Bowden, Nashua, N.H.; Paul Gionet, Lowell, Mass.

[73] Assignee: Duracell Inc., Bethel, Conn.

[21] Appl. No.: 629,985

[22] Filed: Apr. 8, 1996

[51] Int. Cl.$^6$ ................................................. C01G 45/12
[52] U.S. Cl. ........................................ 423/599; 429/224
[58] Field of Search ................................................. 423/599

[56] References Cited

U.S. PATENT DOCUMENTS

| 4,980,251 | 12/1990 | Thackeray et al. ............ 423/599 |
| 5,135,732 | 8/1992 | Barboux . | |

FOREIGN PATENT DOCUMENTS

| 2234233 | 1/1991 | United Kingdom ............ 423/599 |
| 2276155 | 9/1994 | United Kingdom . | |
| 2276156 | 9/1994 | United Kingdom ............ 423/599 |

OTHER PUBLICATIONS

D.G. Wickham and W.J. Croft, J. Phys. Chem. Solids, vol. 7, p. 351 (1958). (no month available).

*Primary Examiner*—Wayne Langel
*Attorney, Agent, or Firm*—Barry D. Josephs; Paul I. Douglas

[57] ABSTRACT

A method of making lithium manganese oxide of spinel structure is disclosed. The method involves the step of prelithiating a manganese oxide by reacting it with lithium hydroxide or lithium salt and then reacting the prelithiated manganese oxide in a second step at elevated temperature to form a lithium manganese oxide spinel. In a specific embodiment manganese dioxide powder is reacted with lithium hydroxide to prelithiate the manganese dioxide and the prelithiated manganese dioxide is separated from the reaction mixture and heated and reacted with lithium carbonate at elevated temperature to convert it to lithium manganese oxide spinel. The spinel product may be used advantageously in secondary (rechargeable) batteries.

17 Claims, No Drawings

METHOD OF PREPARATION OF LITHIUM MANGANESE OXIDE SPINEL

This invention relates to a method of preparation of lithium manganese oxide compound of spinel structure and its use in secondary batteries.

The prior art discloses methods of preparing lithium manganese oxide ($LiMn_2O_4$) of spinel crystalline structure for use in secondary batteries. In one prior art method $LiMn_2O_4$ powders are prepared by heating a mixture of lithium carbonate and manganese oxide powders in air at temperatures between about 800° C. and 900° C. (D. G. Wickham & W. J. Croft, J.Phys. Chem. Solids, Vol. 7, p.351 (1958)). In another method (U.S. Pat. No. 5,135,732) hydroxides of lithium and ammonium in solution with manganese acetate in a sol-gel colloidal suspension are reacted to yield lithium manganese oxide spinel compound. The reactions must be conducted in an inert atmosphere producing a gelatinous precipitate which is dried to yield granular lithium manganese oxide spinel for use in secondary cells. In still another method lithium carbonate is reacted with manganese acetate to produce lithium manganese oxide spinel precipitate which is dried. (U.K. Patent Application GB 2276155) Lithium manganese oxide spinel product made by such prior art methods exhibits considerable loss in capacity during secondary cell cycling.

The method of the invention involves the step of first forming a reaction mixture comprising a manganese oxide and a lithium salt or lithium hydroxide or mixture of a lithium salt and lithium hydroxide. The manganese oxide, for example, may be $MnO_2$, $Mn_2O_3$, $Mn_3O_4$ or MnOOH or mixtures thereof. The lithium salt preferably is lithium nitrate, lithium carbonate, lithium acetate, lithium sulfate or any mixture thereof. Lithium hydroxide or other lithium salts of a weak acid may be used. The mixture is reacted to form a prelithiated manganese oxide ($Li_x$(Mn oxide)), namely, $Li_xMnO_2$, $Li_xMn_2O_3$, $Li_xMn_3O_4$ or $Li_x$MnOOH, respectively, where in each case $0.015<x<0.2$. The prelithiated manganese oxide is preferably then separated from the reaction mixture and subsequently may be reacted with lithium hydroxide (LiOH), lithium nitrate ($LiNO_3$), lithium acetate ($Li(CH_3COO)$), lithium sulfate ($Li_2SO_4$), or lithium carbonate ($Li_2CO_3$) or other lithium salt in a separate step to produce manganese oxide of spinel structure.

The method of the invention is easier to apply and control than prior art methods. The lithium manganese oxide spinel product made by the method of the invention exhibits improved cyclability and improved storability characteristics when used as a positive electrode in secondary (rechargeable) cells having a negative electrode comprising lithium or lithium ions. The improved performance is characterized, for example, by less irreversible capacity loss on cycling when the spinel is used in the positive electrode in secondary cells. It is not known with certainty why this occurs but it is conjectured that the prelithiation forms at least a portion of the lattice framework of the spinel crystalline structure. This seems to make it easier to produce a final lithium manganese oxide spinel product with minimum flaws in the spinel crystalline structure thereby enhancing the performance characteristics of the spinel product in secondary cells. Also, it is conjectured that the presence of small amounts of lithium adsorbed or chemically bound at the surface of the prelithiated manganese oxide $Li_x$(Mn oxide) may have a strong impact on the morphology of the spinel product made therefrom. Such surface characteristics may enhance the performance of the spinel in secondary cells.

The prelithiation reaction is carried out within a temperature range which will achieve the above stated desired degree of prelithiation, but which temperature range is nevertheless low enough that essentially no lithium manganese oxide of spinel structure having the stoichiometric formula, $Li_xMn_2O_{4+\delta}$ ($0.9<x<1.2$ and $0<\delta<0.4$) is formed. "Essentially no formation" of said lithium manganese oxide spinel shall be construed to mean that if any of said lithium manganese oxide spinel is formed during the prelithiation reaction it will be formed from less than 5 percent by weight of the starting manganese oxides, that is, between about 0 and 5 percent by weight of the starting manganese oxides may ultimately be converted to $Li_xMn_2O_{4+\delta}$ ($0.9<x<1.2$ and $0<\delta<0.4$) during the prelithiation reaction. The prelithiation reaction to achieve these results is carried out within a temperature range between about 4° and 400° C., advantageously between about 4° and 90° C., preferably between about 20° and 50° C. for a period of time preferably between about 0.5 and 15 hours. The prelithiation reaction is preferably carried out in an aqueous solution, but may also be carried out in solid phase, for example, when the reactants are lithium nitrate or lithium hydroxide. The prelithiated manganese oxide $Li_x$(Mn oxide) may then be reacted with lithium hydroxide or lithium salt, preferably lithium nitrate, lithium acetate, lithium sulfate or any mixture thereof within a higher temperature range, preferably between about 650° and 900° C., for a period of time preferably between about 24 and 48 hours to produce lithium manganese oxide of spinel structure having a stoichiometric formula $Li_xMn_2O_{4+\delta}$ ($0.9<x<1.2$ and $0<\delta<0.4$.).

In a preferred embodiment of the invention manganese dioxide powder (and even more preferably electrolytic manganese dioxide (EMD)) is reacted with lithium hydroxide which has the effect of prelithiating the manganese dioxide forming $Li_xMnO_2$ ($0.015>x>0.070$). The prelithiated manganese dioxide is then preferably heated to convert it to lithium manganese sesquioxide ($Li_xMn_2O_3$) which in turn may be reacted preferably with lithium carbonate ($Li_2CO_3$) to form lithium manganese oxide spinel. Alternatively, the intermediate step of converting the prelithiated manganese dioxide to $Li_xMn_2O_3$ may be omitted by reacting the prelithiated manganese dioxide directly with lithium carbonate to form lithium manganese oxide spinel.

In accordance with a specific embodiment of the invention manganese dioxide powder is advantageously first washed with acid, preferably with sulfuric acid which has the effect of removing trace amounts of sodium ions or other ion exchangeable cations trapped within the manganese dioxide particles. The acid washed $MnO_2$, is rinsed first and then suspended in fresh deionized water. Lithium hydroxide is added to the suspension over a period of time between about 0.5 and 15 hours while the suspension with added lithium hydroxide is maintained at all time at a temperature of between about 20° and 50° C. The lithium hydroxide is added during this period until a pH of between about 7 and 14, preferably between about 7 and 11, is reached forming a prelithiated manganese dioxide having a stoichiometric formula $Li_xMnO_2$ ($0.015>x>0.070$). The prelithiated manganese dioxide is filtered and dried whereupon it is heated at temperatures between about 550° C. and 600° C., to convert it to lithium manganese sesquioxide, $Li_xMn_2O_3$ ($0.015>x>0.070$). The lithium manganese sesquioxide $Li_xMn_2O_3$ in turn is reacted with lithium carbonate, $Li_2CO_3$, at temperatures between about 650° C. and 800° C. forming lithium manganese oxide spinel of stoichiometric formula $Li_xMn_2O_{4+\delta}$, where $0.9<x<1.2$ and $0<\delta<0.4$. (It will be appreciated that the stoichiometric formulas $Li_xMnO_2$ and $Li_xMn_2O_3$ are intended to include the same compounds, respectively, having slightly more or less oxygen than is indicated in the formula. Therefore, it should be understood that whenever these compounds are referenced herein, the more general formulas $Li_xMnO_{2+\phi}$ and $Li_xMn_2O_{3+\epsilon}$, respectively, are applicable. Typically, $\phi$ may be between about $-0.05$ and $+0.05$ and $\epsilon$ may be between about $-0.01$ and $+0.01$.)

In an alternative embodiment the prelithiated manganese dioxide ($Li_xMnO_2$) is made as above described but the step of converting it first to lithium sequioxide ($Li_xMn_2O_3$) may be omitted. Instead the prelithiated manganese dioxide may be converted directly to lithium manganese dioxide spinel by reacting it directly with lithium carbonate at temperatures between about 650° C. and 800° C. This embodiment while having the advantage of omitting a step has the disadvantage that the final spinel will contain more lattice moisture ($OH^-$ in place of oxygen atoms at defect sites within the spinel structure.) Thus, a purer spinel product, namely, with less lattice moisture, is achieved by first converting prelithiated manganese dioxide to lithium manganese sesquioxide before the final conversion to spinel, e.g. by reacting the lithium manganese sesquioxide with lithium carbonate as above described. Such purer spinel product leads to improved performance characteristics when it is used as the positive electrode in secondary cells. Other specific embodiments of the invention are reflected in the following representative examples:

EXAMPLE 1

A saturated solution of lithium hydroxide is first made by adding excess lithium hydroxide, 100 grams, to 300 milliliter deionized water and maintaining the mixture overnight while stirring. The following day the undissolved solids are filtered out resulting in a saturated lithium hydroxide solution which is set aside.

A 100 gram sample of particulate electrolytic manganese dioxide (battery grade EMD from Kerr-McGee Corp. lot no. 9864) is acid washed by adding 1000 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second washing the acid solution is poured off and the EMD is rinsed with deionized water and allowed to stand overnight. The following day the EMD is rinsed 3 additional times with fresh deionized water. After the last water rinse the water is poured off leaving the EMD behind.

The saturated solution of lithium hydroxide is then poured onto the EMD and stirred for 24 hours while maintaining the mixture at a temperature of 22° C. The following day the solid material is filtered out from the hydroxide solution and dried. Analysis showed the material to be of stoichiometric formula $Li_{0.15}MnO_2$. The material is then heated to 600° C. for 24 hours to convert it to $Li_{0.15}Mn_2O_3$. This material is then heated with lithium carbonate at a temperature of 750° C. for 24 hours to form the lithium manganese oxide spinel product of stoichiometric formula $Li_xMn_2O_{4+\delta}$ (x=1.05, $\delta$=0.2).

EXAMPLE 2

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed three additional times with fresh deionized water. After the last water rinse the EMD is suspended in fresh deionized water and 85 grams of lithium hydroxide is added over a period of time of about 5 minutes to bring the pH to 11.0 all the while maintaining the mixture at a temperature of 22° C. The solution is stirred for 30 minutes at this temperature and then the solid material is filtered out and dried. Analysis showed the material to be of stoichiometric formula $Li_{0.067}MnO_2$. The material is heated to 600° C. for 24 hours to convert it to $Li_{0.067}Mn_2O_3$. This material is then heated with lithium carbonate at 750° C. for 24 hours to form a spinel product of stoichiometric formula $Li_xMn_2O_{4+\delta}$(x=1.05, $\delta$=0.2).

EXAMPLE 3

A 500 gram sample of particulate electrolytic manganese dioxide (battery grade EMD from Kerr-McGee Corp. product no. 9864) is acid washed by adding 2 liters of 1 molar $H_2SO_4$ and stirring for 1 hour. The acid solution is then poured off and the electrolytic manganese dioxide (EMD) is subjected to a second washing, same as the first, with fresh acid solution. The EMD is then rinsed by immersing it in fresh deionized water and allowing it to stand overnight whereupon it is filtered and dried.

The EMD is divided into four equal portions, (125 gm. each) from which four spinel samples are prepared (samples 3A-3D). Each of the four 125 gm. portions of the EMD is suspended in fresh deionized water and stirred for 15 minutes. Each EMD portion is subjected to water rinsing two more times and the material then filtered and dried. The first 125 gram portion of EMD, is set aside to make a control spinel product (sample 3A) that is made without subjecting the EMD to treatment with lithium hydroxide and the remaining three EMD portions are used to prepare a spinel product employing the prelithiation step of the invention.

A comparative spinel (sample 3A) without prelithiation is made as follows:

125 gm. portion of the rinsed and dried EMD is heated to 600° C. for 24 hours to convert it to $Mn_2O_3$. This material is heated to temperatures between about 700° C. and 900° C. with lithium carbonate to form the spinel product of formula $Li_xMn_2O_{4+\delta}$(x=1.05, $\delta$=0.2).

A spinel product (sample 3B) with prelithiation is made as follows:

Approximately 125 grams of the rinsed and dried EMD is suspended in fresh deionized water and 1.2 grams of lithium hydroxide is added over a period of about 5 minutes until the pH of the solution is 7.0. The mixture is maintained all the while at a temperature of about 22° C. The mixture at this temperature is stirred for 30 minutes then filtered and dried. Analysis shows the dried material to have the stoichiometric formula $Li_{0.017}MnO_2$. The material is then heated to 600° C. for 24 hours to convert it to $Li_{0.017}Mn_2O_3$. This material is then heated with lithium carbonate at temperatures between 700° C. and 900° C. to form the spinel product of stoichiometric formula $Li_xMn_2O_{4+\delta}$(x=1.05, $\delta$=0.2).

A spinel product (sample 3C) with prelithiation is made as follows:

Approximately 125 grams of the rinsed and dried EMD is suspended in fresh deionized water and 3.0 grams of lithium hydroxide is added over a period of about 5 minutes until the pH of the solution is 10.0. The mixture is maintained all the while at a temperature of about 22° C. The mixture at this temperature is stirred for 30 minutes then filtered and dried. Analysis shows the dried material to have the stoichiometric formula $Li_{0.041}MnO_2$. The material is then heated to 600° C. for 24 hours to convert it to $Li_{0.041}Mn_2O_3$. This material is then heated with lithium carbonate to temperatures between 700° C. and 900° C. to form the spinel product of stoichiometric formula $Li_xMn_2O_{4+\delta}(x=1.05.\delta=0.2)$.

A spinel product (sample 3D) with prelithiation is made as follows:

Approximately 125 grams of the rinsed and dried EMD is suspended in fresh deionized water and 3.7 grams of lithium hydroxide is added so that the pH of the solution is 11.0. The mixture is maintained all the while at a temperature of about 22° C. The mixture at this temperature is stirred for 30 minutes then filtered and dried. Analysis showed the dried material to have the stoichiometric formula $Li_{0.052}MnO_2$. The material is then heated to 600° C. for 24 hours to convert it to $Li_{0.052}Mn_2O_3$. This material is then heated with lithium carbonate to temperatures between 700° C. and 900° C. to form the spinel product of stoichiometric formula $Li_xMn_2O_{4+\delta}(x=1.05.\delta=0.2)$.

EXAMPLE 4

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide over a period of about 5 minutes is added to bring the pH to 11.0. The solution is maintained all the while at a temperature of about 22° C. The solution at this temperature is stirred for 30 minutes and then the solid material is filtered out and dried. Analysis showed the material to be of stoichiometric formula $Li_{0.067}MnO_2$. The material is heated to 600° C. for 24 hours to convert it to $Li_{0.067}Mn_2O_3$. This material is then heated with lithium nitrate at temperatures between 700° C. and 900° C. for 24 hours to form a spinel product of stoichiometric formula $Li_xMn_2O_{4+\delta}(x=1.05.\delta=0.2)$.

EXAMPLE 5

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide is added over a period of about 5 minutes to bring the pH to 11.0. The solution is maintained all the while at a temperature of about 22° C. The solution is stirred at this temperature for 30 minutes and then the solid material is filtered out and dried. Analysis showed the material to be of stoichiometric formula $Li_{0.067}MnO_2$. This material is then heated with lithium carbonate at temperatures between 700° C. and 900° C. for 24 hours to form a spinel product of stoichiometric formula $Li_xMn_2O_{4+\delta}(x=1.05.\delta=0.2)$.

EXAMPLE 6

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide is added over a period of about 5 minutes to bring the pH to 11.0. The solution is maintained all the while at a temperature of about 22° C. The solution at this temperature is stirred for 30 minutes and then the solid material is filtered out and dried. Analysis showed the dried material to be of stoichiometric formula $Li_{0.067}MnO_2$. The material is heated to temperatures between 850° and 1000° C. for 24 hours to convert it to $Li_{0.067}Mn_3O_4$. This material is then heated with lithium carbonate at temperatures between 700° and 900° C. for 24 hrs. to form a spinel product of stoichiometric formula $Li_xMn_2O_{4+\delta}(x=1.05.\delta=0.2)$.

Performance Tests

The performance of each of the lithium manganese oxide spinel products (samples 3A–3D) made in Example 3 are tested by utilizing the spinel product as a cathode material (positive electrode) in a rechargeable (secondary) cell. A cathode is constructed from each of the spinel products by forming a mixture of spinel (60 wt. %), carbon (35 wt. %) and Teflon (tetrafluoroethylene) (5 wt. %). The mixture is compressed and 60 milligrams of the compressed mixture is utilized as cathode material. The prepared cathode is incorporated into a coin cell having a metallic lithium anode and electrolyte of 1 molar $LiPF_6$ in equal parts of ethylene carbonate and dimethyl carbonate solvent.

Each of the coin cells is subjected to cycling (charge/discharge) tests wherein the lithium cells are cycled between 4.3 and 3.0 volts at a current density of 0.5 milliamp/cm². The spinel between charged and discharged states of the cells being tested may have the stoichiometric formula $Li_xMn_2O_{4+\delta}(0.1<x<1.2)$. The loss in specific capacity of the spinel (mAmphr/g per cycle averaged over 50 cycles) is recorded in the following table. The spinel made in accordance with the method of the invention involving a prelithiation step as above described in Example 3 shows better cycling characteristics, i.e. less capacity loss after 50 cycles than the comparative spinel (sample 3A) which did not employ a prelithiation step.

TABLE 1

| Sample | Pretreatment with LiOH, final pH | Spinel[1], Capacity Loss mAmp-hr/g per cycle (50 cycles) | Prelithiated manganese dioxide $Li_xMnO_2$ |
|---|---|---|---|
| 3A[2] | none | −0.39 | $MnO_2$ |
| 3B | 7.0 | −0.17 | $Li_{0.017}MnO_2$ |
| 3C | 10.0 | −0.14 | $Li_{0.041}MnO_2$ |
| 3D | 11.0 | −.11 | $Li_{0.052}MnO2$ |

Notes:
[1]Spinel product in each case is $Li_{1.05}Mn_2O_{4.2}$, i.e., before cell cycling.
[2]Comparative sample - no prelithiation of $MnO_2$ before spinel product is made.

Although the present invention has been described with reference to specific embodiments it should be understood that variations are possible without departing from the scope and concept of the invention. Accordingly, the present invention is not intended to be limited to the specific embodiments described herein, but is defined by the claims and equivalents thereof.

What is claimed is:

1. A method for making lithium manganese oxide $Li_xMn_2O_{4+\delta}$ of spinel structure comprising the steps of:
   a) forming a reaction mixture comprising a manganese oxide (Mn oxide) and a reactant selected from the group consisting of a lithium salt and lithium hydroxide and any mixture thereof;
   b) reacting said manganese oxide in said reaction mixture to form a lithiated manganese oxide $Li_x$(Mn oxide), where $0.015<x<0.2$, essentially without forming lithium manganese oxide of spinel structure having a stoichiometric formula $Li_xMn_2O_{4+\delta}$, where $0.9<x<1.2$ and $0<\delta<0.4$;
   b.1) separating said lithiated manganese oxide $Li_x$(Mn oxide) from the reaction mixture;
   c) reacting said lithiated manganese oxide $Li_x$(Mn oxide) after step (b.1) with a reactant selected from the group consisting of a lithium salt and lithium hydroxide and any mixture thereof to produce a lithium manganese oxide $Li_xMn_2O_{4+\delta}$ of spinel structure, where $0.9<x<1.2$ and $0<\delta<0.4$.

2. The method of claim 1 wherein said manganese oxide reactant (Mn oxide) in said reaction mixture is selected from the group consisting of $MnO_2$, $Mn_2O_3$, $Mn_3O_4$ and MnOOH and any mixture thereof.

3. The method of claim 1 wherein said lithium salt reactant in said steps (a) and (c) is selected from the group consisting of lithium nitrate, lithium acetate, lithium sulfate and lithium carbonate and any mixture thereof.

4. The method of claim 1 wherein said reaction in step (b) is carried out within a temperature range which is less than the temperature range at which the reaction in step (c) is carried out.

5. The method of claim 4 wherein said reaction in step (b) is carried out within a temperature range of between about 4° and 400° C.

6. The method of claim 5 wherein said reaction in step (c) is carried out within a temperature range of between about 650° C. and 900° C.

7. The method of claim 1 wherein said manganese oxide reactant in step (a) comprises manganese dioxide.

8. A method for making lithium manganese oxide $Li_xMn_2O_{4+\delta}$ of spinel structure comprising:

a) forming a reaction mixture comprising manganese dioxide and a reactant selected from the group consisting of a lithium salt and lithium hydroxide and any mixture thereof;
   b) reacting said manganese dioxide in said reaction mixture to form a lithiated manganese dioxide $Li_xMnO_2$, where $0.015<x<0.2$, essentially without forming lithium manganese oxide of spinel structure having a stoichiometric formula $Li_xMn_2O_{4+\delta}$, where $0.9<x<1.2$ and $0<\delta<0.4$;
   b.1) separating said lithiated manganese oxide $Li_xMn_2$ from the reaction mixture; and
   c) reacting said lithiated manganese dioxide $Li_xMnO_2$ after step (b.1) with lithium carbonate to produce a lithium manganese oxide $Li_xMn_2O_{4+\delta}$ of spinel structure, where $0.9<x<1.2$ and $0<\delta<0.4$.

9. The method of claim 8 wherein said reaction in step (b) is carried out within a temperature range which is less than the temperature range at which the reaction in step (c) is carried out.

10. The method of claim 9 wherein said reaction in step (b) is carried out within a temperature range of between about 4° and 400° C.

11. The method of claim 10 wherein said reaction in step (c) is carried out within a temperature range of between about 650° C. and 800° C.

12. The method of claim 8 wherein the reaction mixture in step (a) comprises electrolytic manganese dioxide (EMD) and lithium hydroxide and the pH of said reaction mixture is at a level between 7 and 14.

13. A method for making lithium manganese oxide $Li_xMn_2O_{4+\delta}$ of spinel structure comprising:
   a) forming a reaction mixture comprising manganese dioxide and a reactant selected from the group consisting of a lithium salt and lithium hydroxide and any mixture thereof;
   b) reacting said manganese dioxide in said reaction mixture to form a lithiated manganese dioxide $Li_xMnO_2$, where $0.015<x<0.2$, essentially without forming lithium manganese oxide of spinel structure having a stoichiometric formula $Li_xMn_2O_{4+\delta}$, where $0.9<x<1.2$ and $0<\delta<0.4$;
   c) heating said lithiated manganese dioxide to produce lithium manganese sesquioxide ($Li_xMn_2O_3$); and
   d) reacting said lithiated manganese sesquioxide with lithium carbonate to produce a lithium manganese oxide $Li_xMn_2O_{4+\delta}$ of spinel structure, where $0.9<x<1.2$ and $0<\delta<0.4$.

14. The method of claim 13 wherein said reaction in step (b) is carried out within a temperature range of between about 4° and 400° C.

15. The method of claim 14 wherein said reaction in step (d) is carried out in a temperature range between about 650° C. and 900° C.

16. The method of claim 15 wherein said heating in step (c) is carried out within a temperature range of between about 550° C. and 600° C.

17. The method of claim 13 wherein the reaction mixture in step (a) comprises electrolytic manganese dioxide (EMD) and lithium hydroxide and the pH of said reaction mixture is at a level between 7 and 14.

* * * * *